(12) United States Patent
Frost et al.

(10) Patent No.: US 8,500,075 B2
(45) Date of Patent: Aug. 6, 2013

(54) LOADING AND CARTING SYSTEM

(75) Inventors: Harlie D. Frost, Austin, TX (US);
Russell W. White, Austin, TX (US)

(73) Assignee: Affinity Labs of Texas, LLC, Dripping Springs, TX (US)

( * ) Notice: Subject to any disclaimer, the term of this patent is extended or adjusted under 35 U.S.C. 154(b) by 0 days.

(21) Appl. No.: 12/784,953

(22) Filed: May 21, 2010

(65) Prior Publication Data

US 2010/0232927 A1  Sep. 16, 2010

Related U.S. Application Data

(63) Continuation-in-part of application No. 11/449,020, filed on Jun. 8, 2006, now Pat. No. 7,819,618.

(51) Int. Cl.
*F16M 11/00* (2006.01)
(52) U.S. Cl.
USPC .............. 248/176.1; 248/398; 248/177.1; 280/47.331
(58) Field of Classification Search
USPC ........... 248/176.1, 398, 157, 177.1, 188.1, 248/188.8, 176.3, 371, 396, 121; 414/800, 414/809; 280/789, 47.34, 87.01, 414.1, 47.331
See application file for complete search history.

(56) References Cited

U.S. PATENT DOCUMENTS

| 2,247,128 | A |   | 6/1941  | Levey |
|---|---|---|---|---|
| 3,712,524 | A |   | 1/1973  | Ames |
| 4,003,485 | A |   | 1/1977  | Edgerton |
| 4,182,467 | A | * | 1/1980  | Graber ........................... 224/309 |
| 4,531,879 | A |   | 7/1985  | Horowitz |
| 4,601,481 | A | * | 7/1986  | Maurice .................... 280/47.331 |
| 4,858,802 | A | * | 8/1989  | Hamby et al. ................ 224/406 |
| 4,895,387 | A | * | 1/1990  | Hawkins et al. ........... 280/414.1 |
| 5,002,299 | A | * | 3/1991  | Firehammer et al. ...... 280/414.1 |
| 5,029,785 | A | * | 7/1991  | Besong, Jr. ................ 248/205.1 |
| 5,197,393 | A |   | 3/1993  | Yeakle .............................. 108/10 |
| 5,417,447 | A | * | 5/1995  | Godbersen ................ 280/414.1 |
| 5,476,352 | A | * | 12/1995 | Culbertson et al. ............. 414/23 |
| 5,687,978 | A | * | 11/1997 | Rhodes et al. ................. 280/30 |
| 5,957,350 | A | * | 9/1999  | Giles ............................. 224/310 |
| 5,961,139 | A | * | 10/1999 | Nichols, II .................. 280/414.1 |
| 6,032,964 | A | * | 3/2000  | Capobianco ............. 280/47.331 |
| 6,126,052 | A | * | 10/2000 | Toivola ......................... 224/401 |
| 6,142,491 | A | * | 11/2000 | Darling, III .................... 280/30 |
| 6,142,492 | A | * | 11/2000 | DeLucia ................. 280/47.331 |
| 6,189,900 | B1 | * | 2/2001  | MacDonald ............. 280/47.331 |
| 6,361,060 | B1 | * | 3/2002  | Kamminga ................ 280/414.1 |
| 6,467,843 | B1 |   | 10/2002 | Rossborough ........... 297/344.18 |
| 6,705,822 | B2 |   | 3/2004  | Oldak |
| 6,719,566 | B2 |   | 4/2004  | Farenholtz et al. ........... 434/267 |
| 6,923,468 | B1 | * | 8/2005  | Barnett et al. ................ 280/651 |

(Continued)

*Primary Examiner* — Terrell McKinnon
*Assistant Examiner* — Monica Millner
(74) *Attorney, Agent, or Firm* — Trop, Pruner & Hu, P.C.

(57) ABSTRACT

In one aspect, the present invention includes loading and carting system having support mechanisms each including pairs of telescoping members extending away from each other and an object sling extending between the pairs. The system further includes a reversible platform to which the support mechanisms are mounted, where the platform includes on a first side thereof a set of base portions in which the support members are mounted and on a second side thereof wheel mounts to which wheels can be mounted. The first side may be configured to support a bulky object during a carting process and the second side configured to support the object during a loading or unloading process.

8 Claims, 14 Drawing Sheets

(56) References Cited

U.S. PATENT DOCUMENTS

| | | | |
|---|---|---|---|
| 6,926,292 B1 * | 8/2005 | Weeks | 280/47.331 |
| 7,017,939 B2 | 3/2006 | Darling, III | 280/652 |
| 7,219,956 B2 | 5/2007 | Zhang | 297/195.11 |
| 7,243,928 B2 * | 7/2007 | Singer | 280/47.331 |
| 7,326,013 B2 * | 2/2008 | Heuvel et al. | 410/44 |
| 7,401,856 B2 | 7/2008 | Marchand et al. | 297/314 |
| 7,407,361 B2 * | 8/2008 | Bellerose et al. | 414/482 |
| 7,997,827 B2 * | 8/2011 | Fogg | 405/3 |
| 2001/0004148 A1 * | 6/2001 | Darling, III | 280/30 |
| 2003/0230915 A1 | 12/2003 | Checketts | 297/195.11 |
| 2006/0017246 A1 * | 1/2006 | Singer | 280/47.331 |
| 2006/0103222 A1 | 5/2006 | Caruso et al. | 297/452.15 |
| 2007/0252419 A1 | 11/2007 | Takahashi | 297/312 |

* cited by examiner

LOADING AND CARTING SYSTEM

CROSS REFERENCE AND PRIORITY CLAIM

This application is a Continuation-In-Part (CIP) of U.S. patent application Ser. No. 11/449,020, filed Jun. 8, 2006 now U.S. Pat. No. 7,819,618 and entitled, "A Loader Device For Assisting In Lifting Bulky Objects".

TECHNICAL FIELD

The following disclosure relates to a device useful for maneuvering bulky objects and loading them onto other objects such as the roof of a car or a shelving unit.

BACKGROUND

It is difficult for one person to load and unload an ungainly object such as a kayak, canoe, windsurfer or ladder on an object such as a ledge, shelf or car roof. Moreover, it is difficult to move such an object around either after unloading or as a precursor to loading the object onto something else. The easiest method may be for two people to do the loading and unloading. Often, however, it is inconvenient to obtain a second person's help.

There are a number of conventional devices that are helpful in loading bulky objects on car tops, but each of these objects has significant drawbacks. One type rolls the object up the back of the vehicle. See U.S. Pat. No. 2,247,128 (Levey). Another type rolls the object up and down the side of a vehicle. See U.S. Pat. No. 4,531,879 (Horowitz). Still another loads it on a frame that extends sideways from a roof rack and that then tilts up and slides into place. See U.S. Pat. No. 4,003,485 (Edgerton). Other systems include one that requires an additional min-rack on the trunk of a car in order to have a more convenient place on which to slide the object. See U.S. Pat. No. 3,712,524 (Ames). Another system involves a rack system with a v-shaped roller system under which a canoe, kayak, etc. has the front lifted to the back of the vehicle, attached to the rolling system and rolled onto the top. See U.S. Pat. No. 5,957,350 (Giles). And, still another involves a portable roller system that attaches to the front or rear of a vehicle. See U.S. Pat. No. 6,705,822 B2 (Oldak). With the Oldak device, the kayak or canoe, etc. is lifted onto the roller device and then rolled onto the roof.

Each of these devices come with design flaws that make them either cumbersome to use, expensive to make, single purpose in their use, or some combination of these things. As such, a better solution is needed.

DETAILED DESCRIPTION

Figure 1:
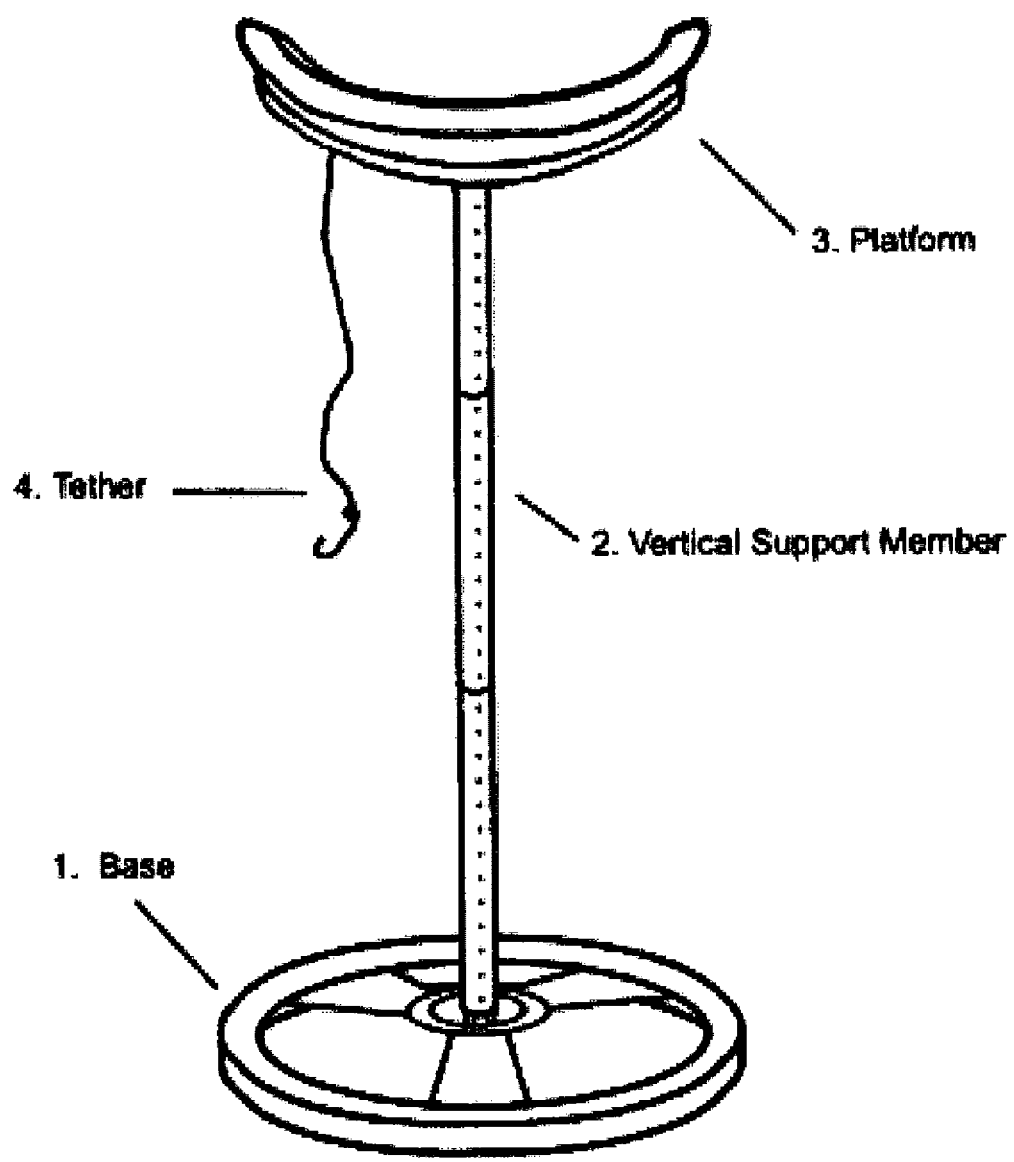
FIG. 1 depicts one type of loading mechanism that incorporates teachings of the present disclosure. The depicted embodiment has a base, a vertical support member, a platform attached to the vertical support member, and a tethering mechanism.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. Moreover, other teachings can be utilized in this application. The teachings can also be utilized in other applications and with several different types of devices and purposes.

Loading bulky objects such as kayaks on a vehicle or shelf is ungainly, often resulting in strained muscles and damage to the vehicle or shelf, in the case of the vehicle including scraped paint and damage to windows and mirrors. The height of most vehicles, in particular, and the ungainly bulk of the object make it difficult to lift the object smoothly to the top of the vehicle. Similar difficulties apply to shelves, platforms, etc. Even if two people are available at the initial loading location, two people may not be available at the unloading point to unload or to reload the object.

An appropriate loading mechanism may need to accommodate loading by one person both at home and away. Additionally, it may need to accommodate the ability to load from different angles to account for obstacles in garages, driveways or at a lake or stream. Depending on designer preference, it might be relatively inexpensive to make, easy to transport, and easy to use.

The basic concept is to create an elevate-able platform on which to balance the first end of the bulky object and to use that platform as a fulcrum point. A tether of some sort, bungee, tie, elastic loop, etc. may be useful in keeping the end of the object in place. The height of the platform when elevated can be a height that allows the second end to be swung up and onto the loading area. After placing the second end on the vehicle or other loading area, the first end may be removed from the platform and rotated onto the vehicle or other loading area. The invention is not limited to a specific number of bases or vertical support members. In one embodiment, two or more bases and vertical support members could be used with a platform structure between them.

As indicated above, a loading mechanism may have an elevate-able platform. For example, the platform may have a lowered position, an elevated position, and additional height-based positions in between. An appropriate height can be achieved through a number of familiar techniques. Vertical support members of differing sizes could be attached to the base and the platform. Adjustable height vertical support members could be used. Mistral's Windglider has a system under which vertical support members are inserted into one another in different ways to achieve different heights. Simple systems involving small holes with small rods that slip into them, similar to the way in which windsurfing booms are adjusted, should work well. The vertical support member or rod could be permanently attached, especially if the vertical support member was adjustable but the device would be easier to transport if the pieces separated.

The base need not be round and the attachment of the rod or vertical support member need not be in the center. An elongated base with an attachment at the opposite end of the bulky object, for example, might give more stability. More than one place could be provided for the attachment of the vertical support member. The base could also be able to be shaped in more than one manner, such as with a series of arms that fold in and out.

The platform could be flat or shaped for the particular object. It could be made of semi-flexible material to shape as desired. Different platform shapes could be available and the platforms could be substituted. Additional platform flexibility could be achieved with the ability to tilt and rotate the platform on the vertical support member. A downward initial tilt of the platform could be useful in making the initial placement of the bulky object on the platform. The shape of the platform and tethering devices could add additional stability in maintaining the connection of the object with the platform. The lifting of the other end of the object could result in a tilt back up of the platform and a swiveling capacity of the platform on the vertical support member, could aid in placing the other end of the object on the loading area. Similarly rotation could be at the base attachment of the vertical support member or somewhere in the vertical support member itself.

A wheeled base may aid in flexibility of loading and unloading the platform. Stability may, however, require that the wheels have a locking mechanism similar to office chairs, wheel chairs, etc. Larger wheels allow the same base of the device to be used as a carrier for the object. The rod could be lowered or removed and the object, usually a kayak or a canoe in such case, could be attached to the base. The other end could be picked up and the bulky object rolled. Such a device without a vertical support member is frequently used to move kayaks to and from the water. A scissors like base is attached to two wheels. One end of the kayak is attached to the base and the other end is picked up and used to roll the kayak to the desired place. Such a device could be combined with the vertical support member and the platform to create a device that would have utility both as a loader and a device to roll the object and could be made cheaper and be more portable than both devices separately.

The use of two of the devices in combination might make loading even easier. The ends could, in turn, be raised gradually to make the lifts each small. Additionally, if the wheeled based variety is used and the object is longer than the length of the object with a loading area, such as a car and roof, that the object is loaded upon, the loaders could be set higher than the top of the loading area and the devices wheeled around the front and back of the object and then lowered to the desired position. For example, if a kayak was to be loaded on a car with a car top carrier with two wheeled loading devices, the devices could be set up either at the right and left rear of the car perpendicular to the length of the car. The kayak or other bulky object could be loaded on the two loading devices. The devices could then be wheeled along the length of the car to the approximate middle of the car top carrier. The kayak could be lowered to the carrier and then spun on the rack into place.

It is often useful to use a short step-ladder to help with attaching an object to an automobile, truck, ledge etc. The base could be a short step-ladder to which the vertical support member is attached. This adds stability to the loading process and provides a handy step-ladder for work in securing the kayak or other bulky object to the loading platform. The step-ladder design could also be on wheels with brakes giving the loader the step-ladder and wheeled device advantages.

Figure 2:
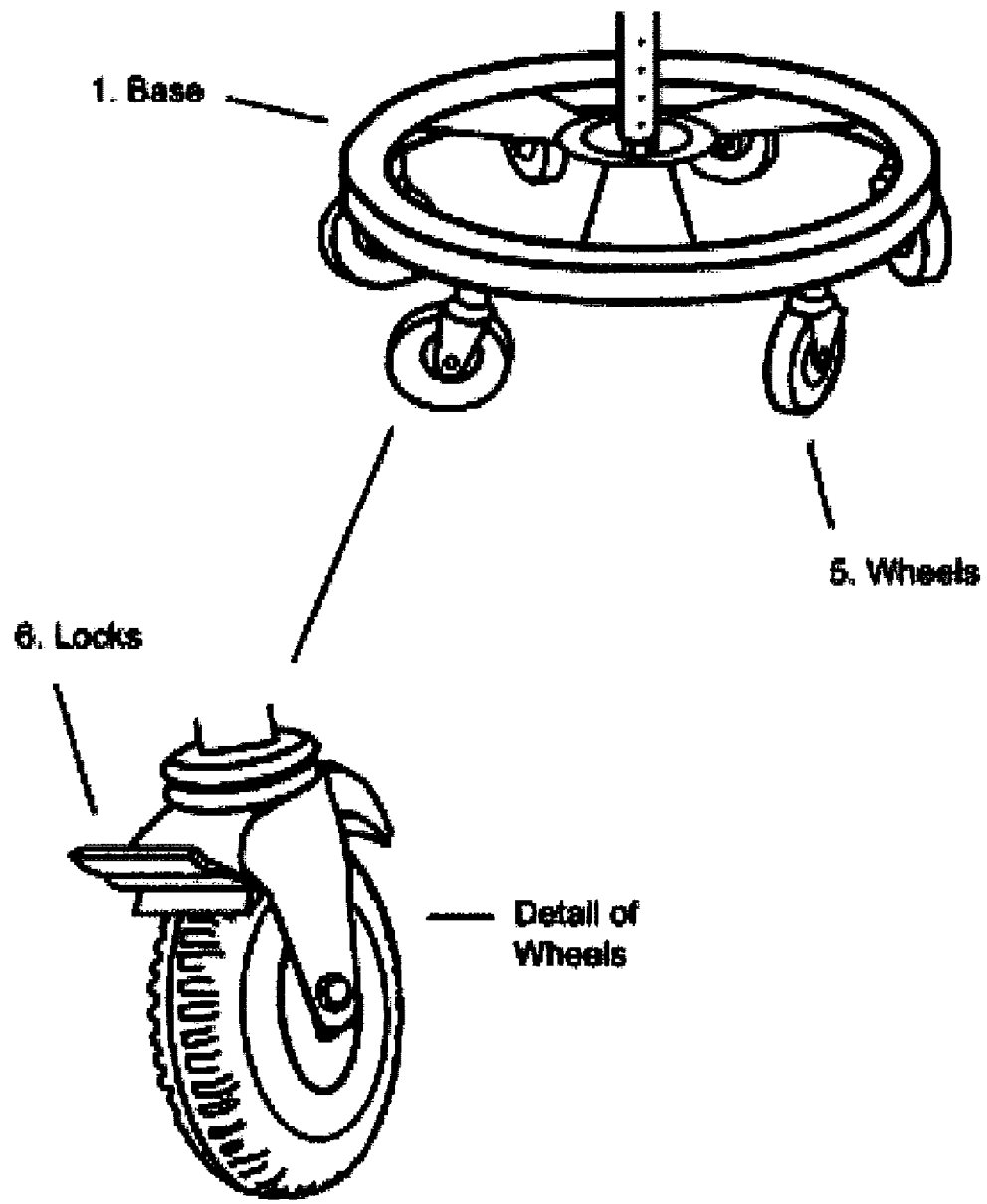
FIG. 2 depicts a base with wheels and a locking mechanism that may make up part of a loading mechanism that incorporates teachings of the present disclosure.
Figure 3:
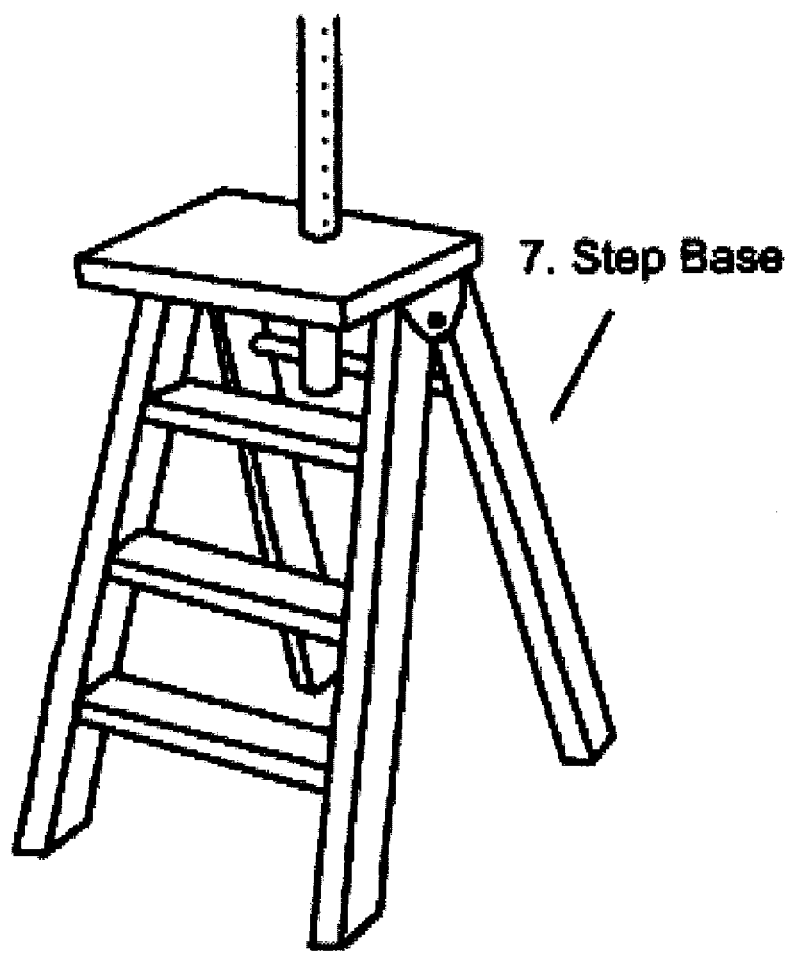
FIG. 3 depicts a base with a step ladder like feature that may make up part of a loading mechanism that incorporates teachings of the present disclosure.
Figure 4:
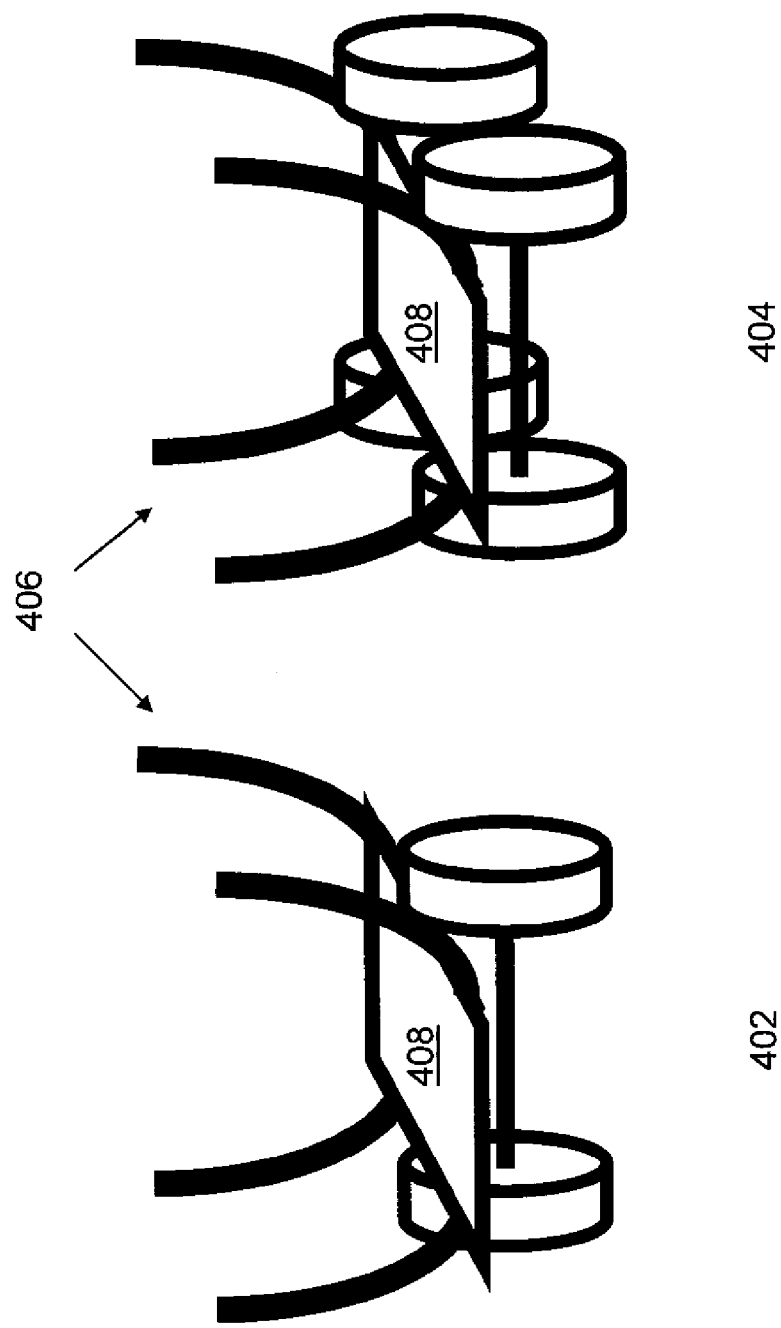
FIG. 4 depicts a generalized drawing of two loading carts that incorporate teachings of the present disclosure.

As mentioned above in the Brief Description of the Drawings, FIG. 1 depicts one type of loading mechanism that incorporates teachings of the present disclosure. The depicted embodiment has a base 1 to which the first end of vertical support member 2 is attached and a platform 3, which is attached to the second end of vertical support member 2. A tethering mechanism 4 is also attached to platform 3. FIG. 2 illustrates a version of base 1 that includes wheels 5 and locks 6. Locks 6 may allow a user to temporarily stop wheels 5 from rolling. FIG. 3 illustrates another type of base 7 that consists of a step-ladder like device. One skilled in the art will recognize that other types of bases, wheels, locks, support members, platforms, and tethering mechanisms may be used. The items depicted in FIGS. 1-3 are illustrative and are not intended to represent an exhaustive display of the component parts a designer may use to create a loading mechanism that incorporates teachings from the present disclosure.

Specific examples of loading and carting mechanisms that incorporates many of the present teachings is shown in FIGS. 4-13. As mentioned above, FIG. 4 depicts a generalized drawing of two loading carts 402 and 404 that incorporate teachings of the present disclosure. As shown, cart 402 is a two-wheeled cart and cart 404 is a four-wheeled cart. In addition, each of the carts includes four telescoping supports 406, which may be securely mounted to a reversible platform 408. Telescoping supports 406 and reversible platform 408 are further discussed below.

Figure 5:
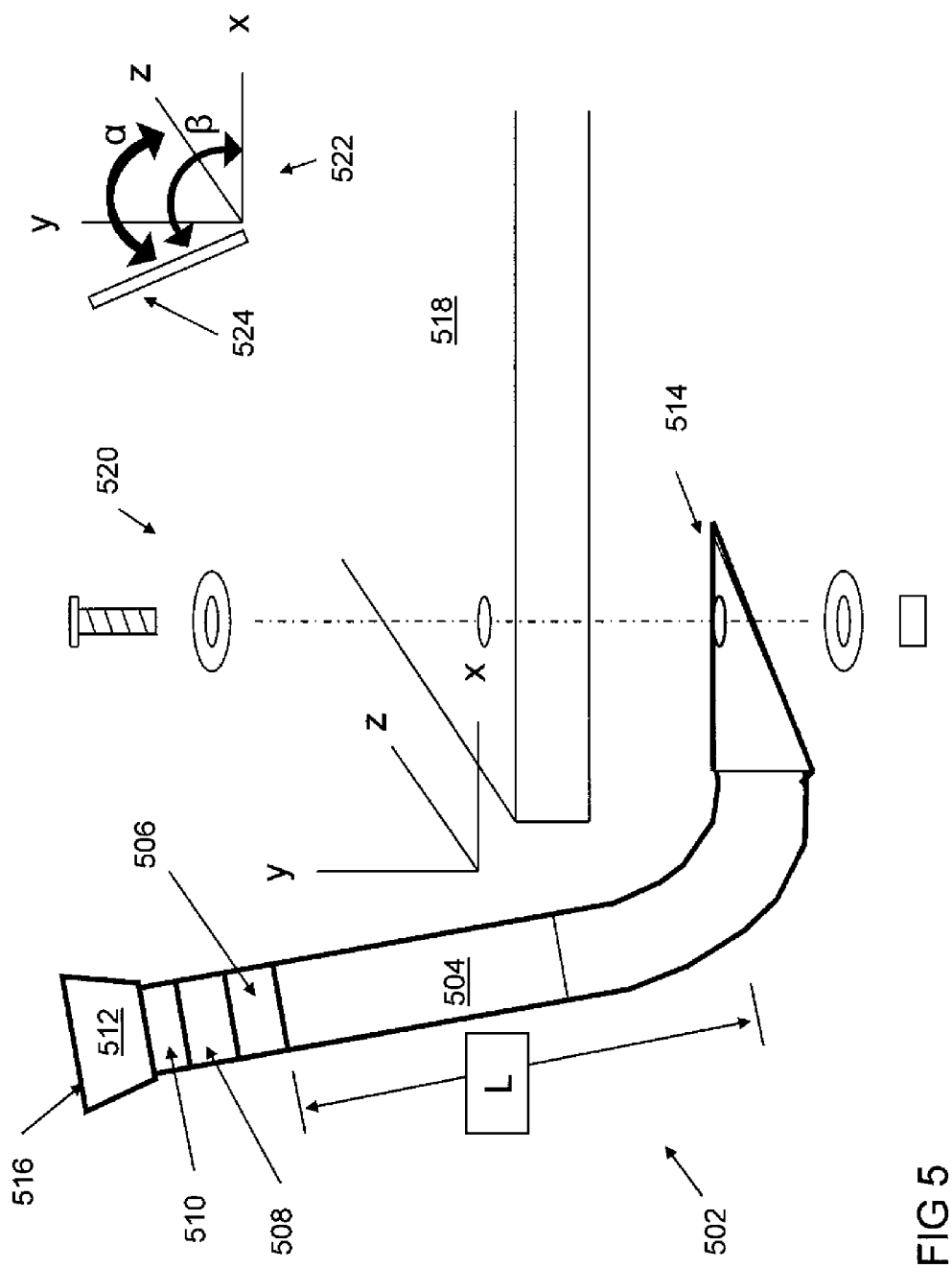
FIG. 5 depicts one type of telescoping support mechanism that incorporates teachings of the present disclosure.

For example, FIG. 5 depicts one type of telescoping support mechanism 502 that incorporates teachings of the present disclosure. Support 502 may be constructed to have a generally tubular shape and may include several telescoping members. The number of telescoping members may depend upon the intended uses for the loading mechanism that includes support 502. As shown, support 502 may include a primary member 504, a secondary member 506, a tertiary member 508, and a quarternary member 510. Each of these members may telescope into and out of one another. Moreover, the members may be configured to lock into one or more places when extended and/or when compressed.

As shown, primary member 504 is the outermost member and at least a portion of each of the other members may ultimately nest inside of primary member 504 when support 502 is in a compressed state. A designer may alter the overall length of support 502 by using more or less members and/or by altering the length of the members used. In one embodiment, member 504 may have a length (identified as "L" in FIG. 5) of fourteen to twenty-six inches. In other embodiments, the members may be longer or shorter. In addition, a design could telescope such that quarternary member 510 becomes the outermost member. Moreover, the amount of each component member that nests inside of another member may be altered to suit the desires of a product designer.

As shown, support 502 includes a footing 512 at one end and a mounting location 514 near the other end. Footing 512 may be a rubber or rubber-like material that attaches to one of the telescoping members. Footing 512 may be formed and sized to engage the ground when support 502 is inverted. Footing 512 may also be rotatably coupled to a telescoping member such that a resting surface 516 of footing 512 may wobble in order to sit squarely or near squarely on the ground when support 502 is inverted.

As mentioned above, mounting location 514 may allow support 502 to be attached to platform 518 with a mounting system like mounting system 520. In practice, two support members 502 may be connected at opposite sides of platform 518. In such a system, the two supports and the platform interconnecting them may represent a composite support structure. As shown in FIG. 5, mounting system 520 includes a machine screw, two washers, a nut, and holes drilled through platform 518 and some portion of mounting location 514. Other mounting systems may be used without departing from the spirit and scope of the present disclosure. As shown, the interplay of mounting system 520, platform 518, and mounting location 514 may allow support 502 to be connected to platform 518 to create various offset angles. Schematic 522 depicts a representation 524 of support 502. As shown, representation 524 (representing support 502 and its orientation relative to platform 518) may be fixed in place to create angles alpha and beta.

By way of illustration, if representation 524 were mounted "squarely" to platform 518, both angle alpha and angle beta would equal 90 degrees. As shown, both angles alpha and beta are larger than 90 degrees. The specific angles chosen by a designer may depend upon the intended use of the loading mechanism utilizing supports like support 502. The angles could be more or less that 90 degrees, and in some cases may be variable. In one embodiment, when the supports are in a deployed position, one or both of angles alpha and beta may be between 90 and 110 degrees, with the understanding that angles alpha and beta may or may not be equal to one another.

Figure 6:
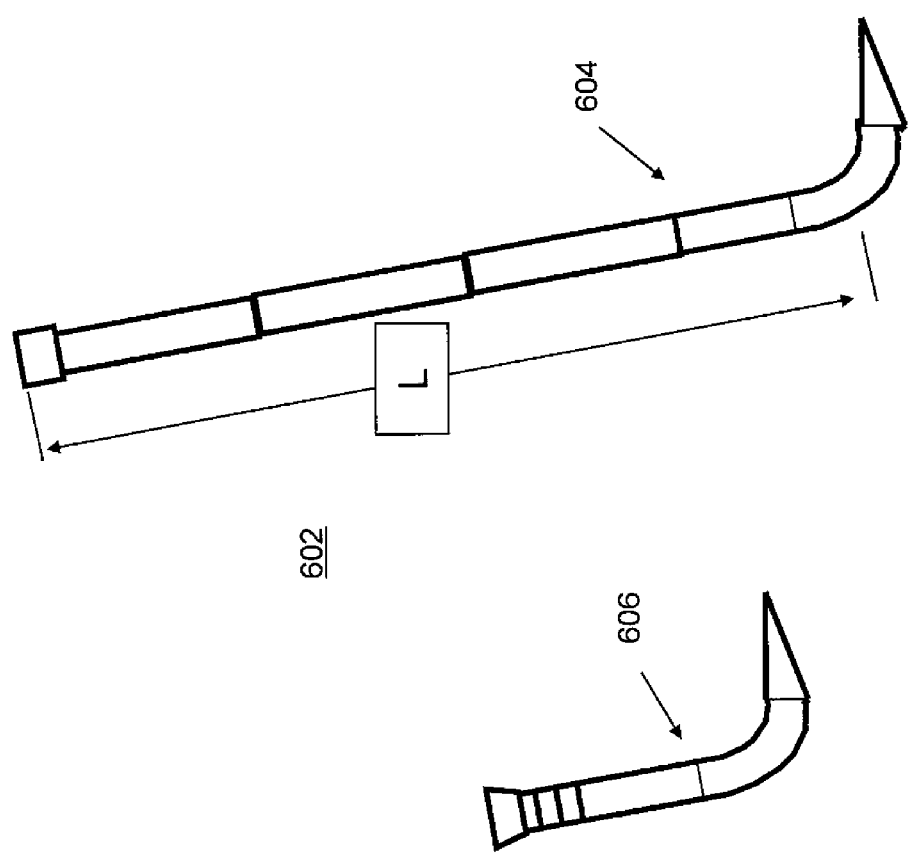
FIG. 6 depicts an expanded and compressed view of a telescoping support mechanism that incorporates teachings of the present disclosure.
Figure 7:
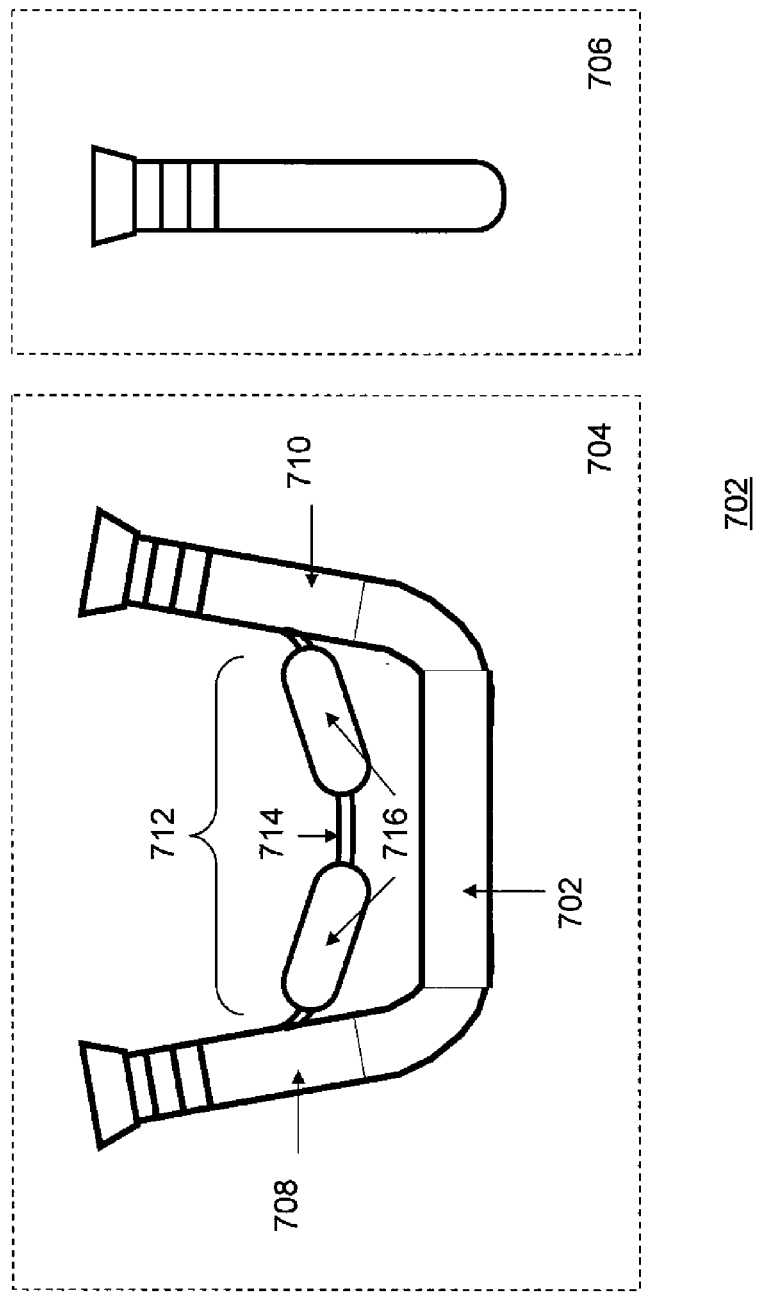
FIG. 7 shows two views of another type of telescoping support mechanism that incorporates teachings of the present disclosure.

As mentioned above, a telescoping support design may be configured to take at least two positions—an expanded position and a compressed position. By way of example, FIG. 6 depicts a telescoping support mechanism 602 in an expanded position 604 and a compressed position 606. One skilled in the art will recognize that additional intermediate positions may be added without departing from the teachings of the present disclosure. The skilled artisan will also recognize that there are several different mechanisms and techniques for "locking" the telescoping support into its various positions. Members could be rotated relative to one another to create the "locking". One member could include a spring loaded dowel that extends through a hole drilled through the wall of a different member, etc.

In some embodiments, the designer may choose to have a "locking" mechanism for the extended position and to eschew the use of a locking mechanism for the compressed position. Moreover, depending upon design concerns, the number, length, size, wall thickness, cross-section, etc. of the utilized telescoping members may be altered to meet the needs of the designer. For example, a designer may choose member lengths and segment amounts such that expanded position 604 yields a length (depicted as "L" in FIG. 6) of between thirty-six and seventy-two inches. In one embodiment, the length "L" may be between forty and sixty inches. The length "L" may be chosen to accommodate use with vehicles having different roof heights. Moreover, a compressed length of the member may be chosen to ensure that an assembled loading cart that incorporates the teachings disclosed herein has dimensions that allow it to fit within a typical vehicle's trunk. For example, such a cart may have a compressed height of some designer chosen range, which may be 16 to 24 inches. In one embodiment, a compressed cart may have a volume of less than 3 cubic feet.

As mentioned above, FIG. 7 shows two views of another type of telescoping support mechanism 702 that incorporates teachings of the present disclosure. Head on view 704 and side view 706 show that telescoping support 702 is a composite support that includes two telescoping support arms 708 and 710. Each of arms 708 and 710 may operate like support 502 or 602, and the above discussion of supports 502 and 602 may be applied to arms 708 and 710.

As shown, arms 708 and 710 extend upward and slightly away from one another. An object sling 712 extends between arms 708 and 710 and may be securely attached to each of the arms. As shown, sling 712 may include a cord 714 and two pads 716. In practice, an object such as a canoe or a kayak may be rested upon sling 712. As such, cord 714 may be flexible and pads 716 may be somewhat deformable to allow sling 712 to conform to the shape of the object being rested on sling 712. Moreover, the materials and the dimensions of the materials utilized to make cord 714 and pads 716 may be sufficiently strong and durable to allow sling 712 to operate as needed. One skilled in the art may choose the same or different materials from which to make cord 714 and pads 716. In one embodiment, cord 714 may include one or more of the following materials: a rope, a fabric, a cable, a bungee-like material, etc. Similarly, pads 716 may include one or more materials like rubber, foam, etc. In practice, sling 712 may be formed such that pads 716 are fixed or fixable in a given position along cord 714. In some cases, pads 716 may be mounted on cord 714 such that pads 716 can slide along cord 714.

Figure 8:
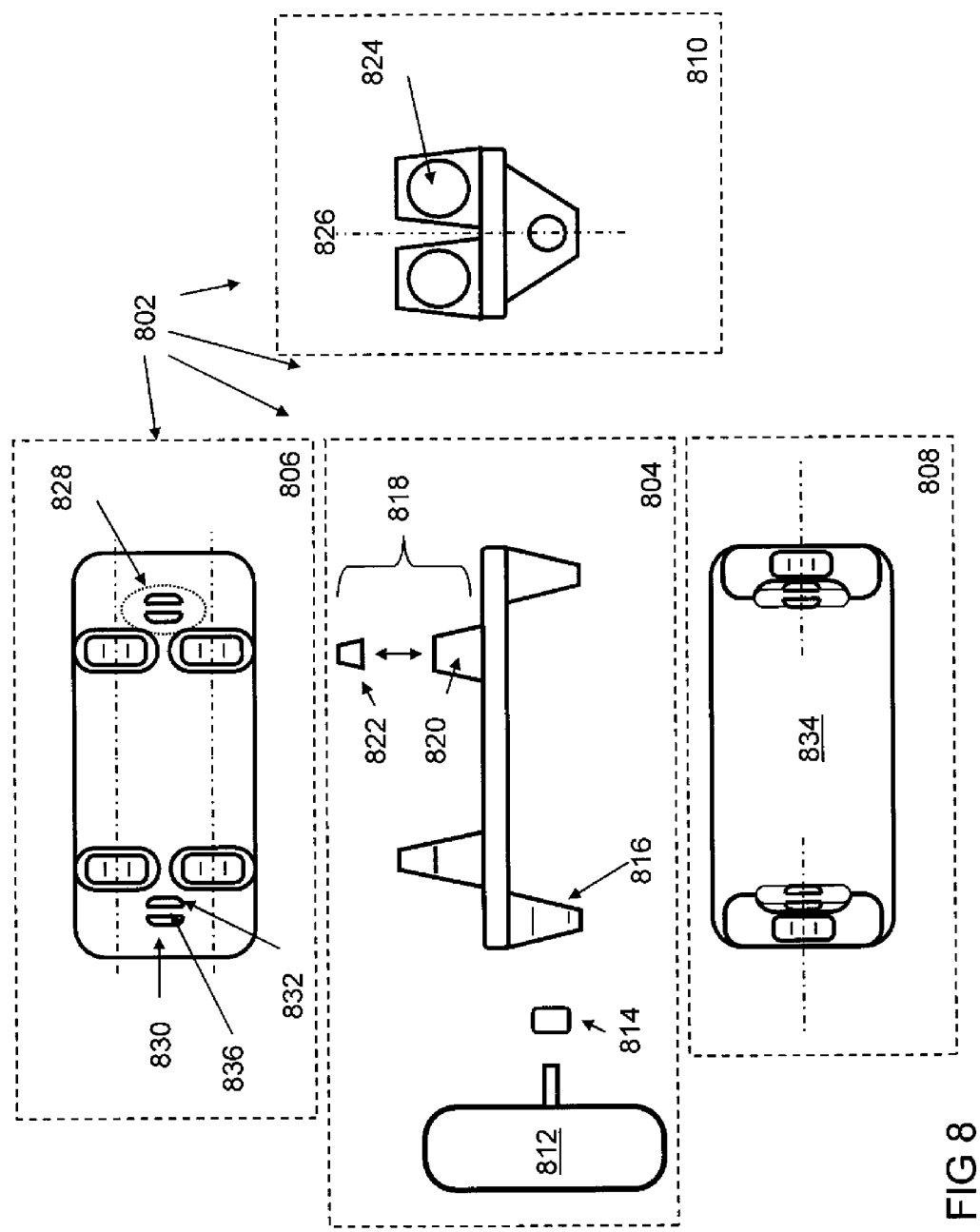
FIG. 8 depicts several views of a reversible platform that incorporates teachings of the present disclosure.

As indicated by FIG. 5, a designer may want to couple a given support member to a platform. While FIG. 5 depicts one system (mounting system 520) for doing this, other techniques are available. FIG. 8 depicts several views of a reversible platform 802 that incorporates teachings of the present disclosure. As shown, platform 802 teaches, among other things, another technique for mounting a telescoping support like support 702 to a platform. To facilitate an understanding of platform 802, various views are depicted in FIG. 8. Namely, FIG. 8 includes front view 804, top view 806, bottom view 808, and side view 810.

As shown, platform 802 is designed for use in a two-wheeled system that has two composite telescoping support mechanisms. In other words, a designer could use platform 802 with two wheels and two supports like support 702. In connection with view 804, one wheel 812 and an associated bearing 814 are shown in an exploded view. In practice, the axle of wheel 812 would be affixed inside bearing 814, which would be located inside wheel mount 816.

A support mounting system 818 is also shown in connection with view 804. As depicted, mounting system 818 includes a base portion 820 that is formed into the bulk of platform 802 and a removable top portion 822 that is shown in a removed position. In a manufacturing or assembly process, top portion 822 may be removed from base portion 820 to allow a support like support 702 to be mounted into base portion 820. Once the support is pressed into base portion 820, top portion 822 may be affixed to base portion 820 with screws, clips, etc. Once affixed, base portion 820 and top portion 822 may form an open cross section within which a mounted support may be rotated and/or fixed in a manner that disallows rotation.

View 810 shows an example cross section. As depicted, open cross section 824 is generally circular. Other cross sections may be used depending upon design concerns. Moreover, rotation limiters may be implemented within mounting system 818 and/or the support being mounted to platform 802. For example, a designer may not want a given support to be capable of rotating past a center line (like center line 826 depicted in view 810). In such a circumstance, the designer may modify or alter mounting system 818 and/or the support mounted therein to limit the rotation of a mounted support.

Figure 11:
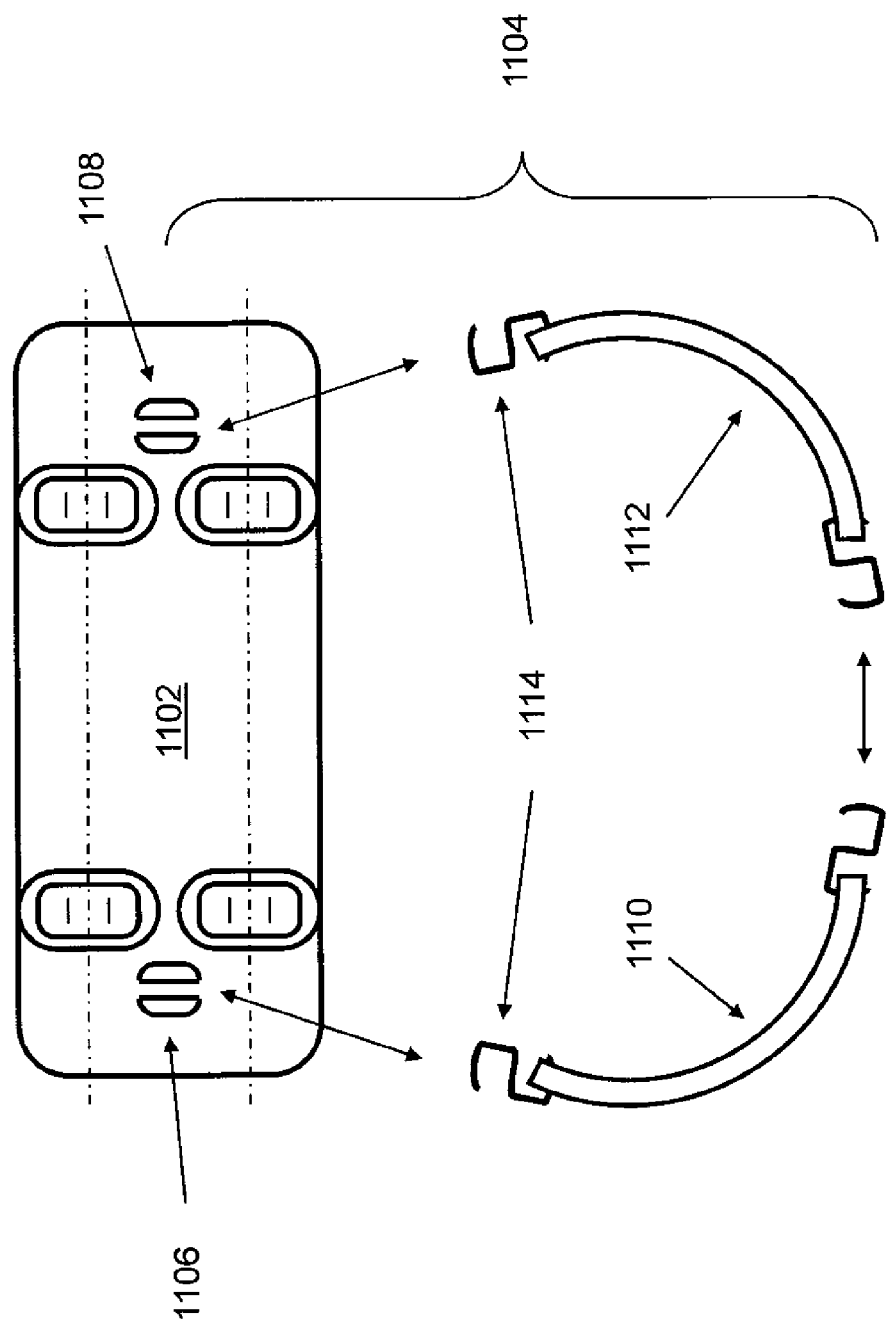
FIG. 11 depicts a reversible platform and one type of tethering system that incorporates teachings of the present disclosure.

Views 806 and 808 show an additional element of platform 802. This additional element, a tether attach point, is identified by numeral 828. Attach point 828 is formed by two slits 830 and 832 that extend through the base portion 834 of platform 802. In practice, a user of platform 802 may have a tethering mechanism that includes one or more bungee-like cords. An example of such a tethering system is shown in FIG. 11. In such a system, the user may elect to extend the hook-like end of a bungee cord through one of the slits like slit 830, turn the hook through a quarter turn, and then extend the tip of the hook back through the other slit. In effect, the user would be hooking center strip 836 with the hook-like end of a bungee cord. As such, attach point 828 acts as a convenient location to attach a bungee cord to platform 802.

Figure 9:
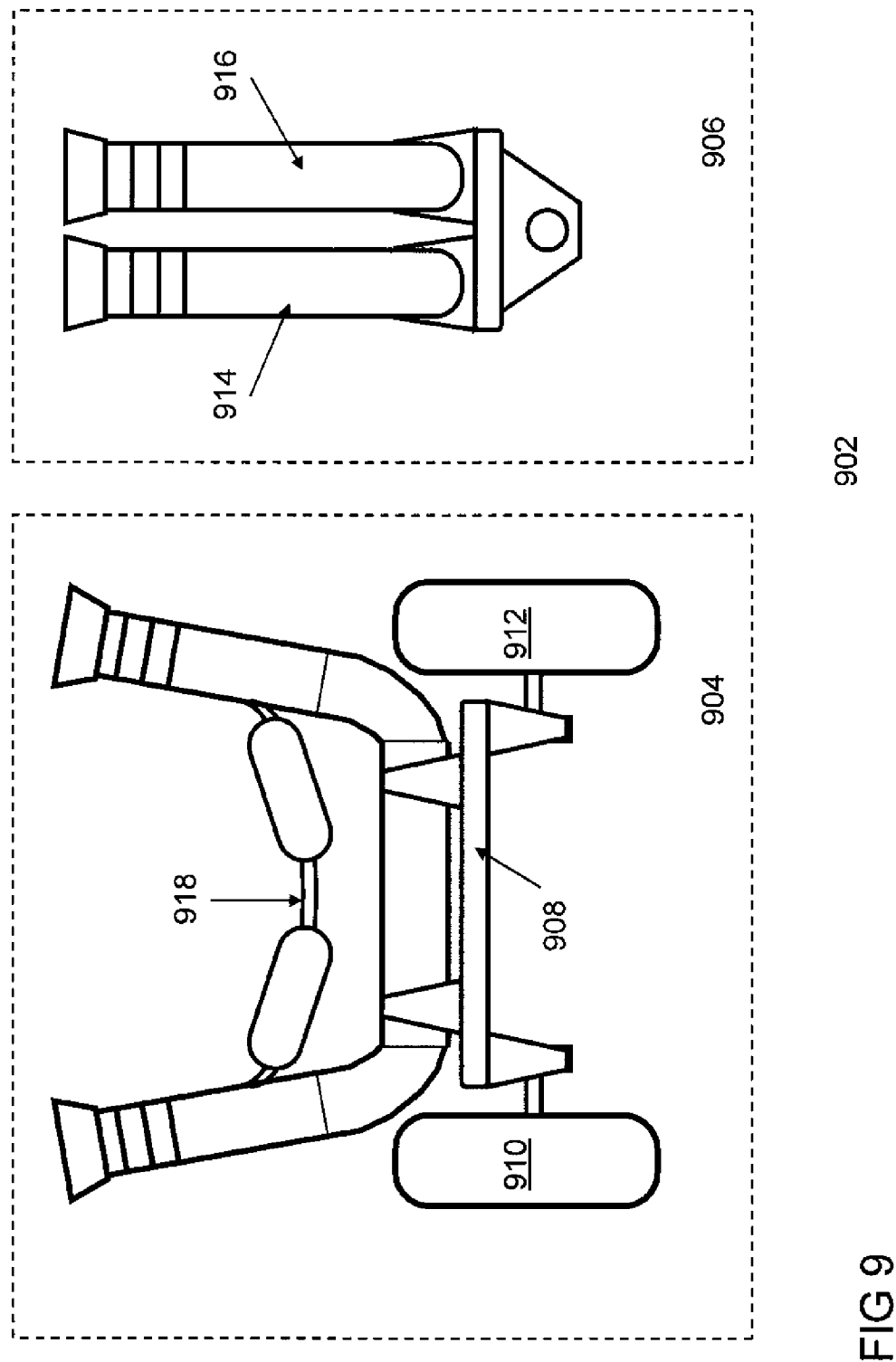
FIG. 9 depicts two views of a loading cart that incorporates teachings of the present disclosure.

FIG. 9 depicts two views of a loading cart 902 that incorporates teachings of the present disclosure. Head on view 904 and side view 906 show a platform 908, which may be very similar to platform 802. View 904 shows that two tires 910 and 912 are attached to platform 908 such that the tires can roll along the ground. As shown, tires 910 and 912 can be sized and shaped to facilitate use of cart 902. In some embodiments, tires 910 and 912 may include a central wheel and rubber or rubber-like tires that may have an internal tube that can be inflated to an appropriate pressure. Tires 910 and 912 could take other forms as well. For example, tires 910 and 912 could be balloon-like inflatable tires that can be easily inflated or "blown-up" by mouth before use and then deflated to a near flat state when the cart is not in use. Tires 910 and 912 could also be rigid wheels that do not include an inflatable tube or bladder. The term tire is understood to include many different rolling options and is broad enough to include objects like a wheel, a balloon like structure, a ball like structure, a car-like tire, a dolly-like tire, etc. The type, size, number, and make-up of the tires used may depend on designer preference and/or the intended uses of cart 902. In some cases, tires 910 and 912 may be readily removable. This feature may allow a user to pick an appropriate tire for a given use or circumstance. For example, if a user intends to roll cart 902 across a soft sandy surface like the beach, the user may want large balloon-like inflated tires with sufficient surface texture to grab and roll along the sand. If the user intends to roll cart 902 along a rocky and brush filled slope like one might find along a river or lake's edge, the user may want a tube or tubeless tire that is sufficiently durable to survive the rough terrain. And, given that the same user might be at the beach on one day and a lake the next, the user may want the option of switching tire type. As such, platform 908 may include a quick disconnect mechanism for attaching and removing tires.

As shown in view 906, two composite telescoping supports 914 and 916 may be rotatably coupled to platform 908. In practice, supports 914 and 916 may be stored in an upright position when cart 902 is not in use. A user may choose to rotate support 914 in a counter-clockwise direction and support 916 in a clockwise direction to "open up" the supports. Assuming each of supports 914 and 916 have their own sling like sling 918, opening up the supports may create a more stable mechanism for holding one end of a canoe when that end of the canoe is resting on cart 902. In addition, if cart 902 is flipped into an "upside down" position, the opening up of supports 914 and 916 may create a more tip resistant structure when cart 902 rests on the ground in the upside down orientation. This effect may be enhanced by the flared "U" shape of supports 914 and 916. This flared "U" shape can be better appreciated in view 904. The flared "U" shape of supports 914 and 916 in combination with the opening up of supports 914 and 916 may create angles alpha and beta and may enhance the stability of cart 902 when it rests (in an upside down position) on the four footings that are located at the ends of supports 914 and 916.

Figure 10:
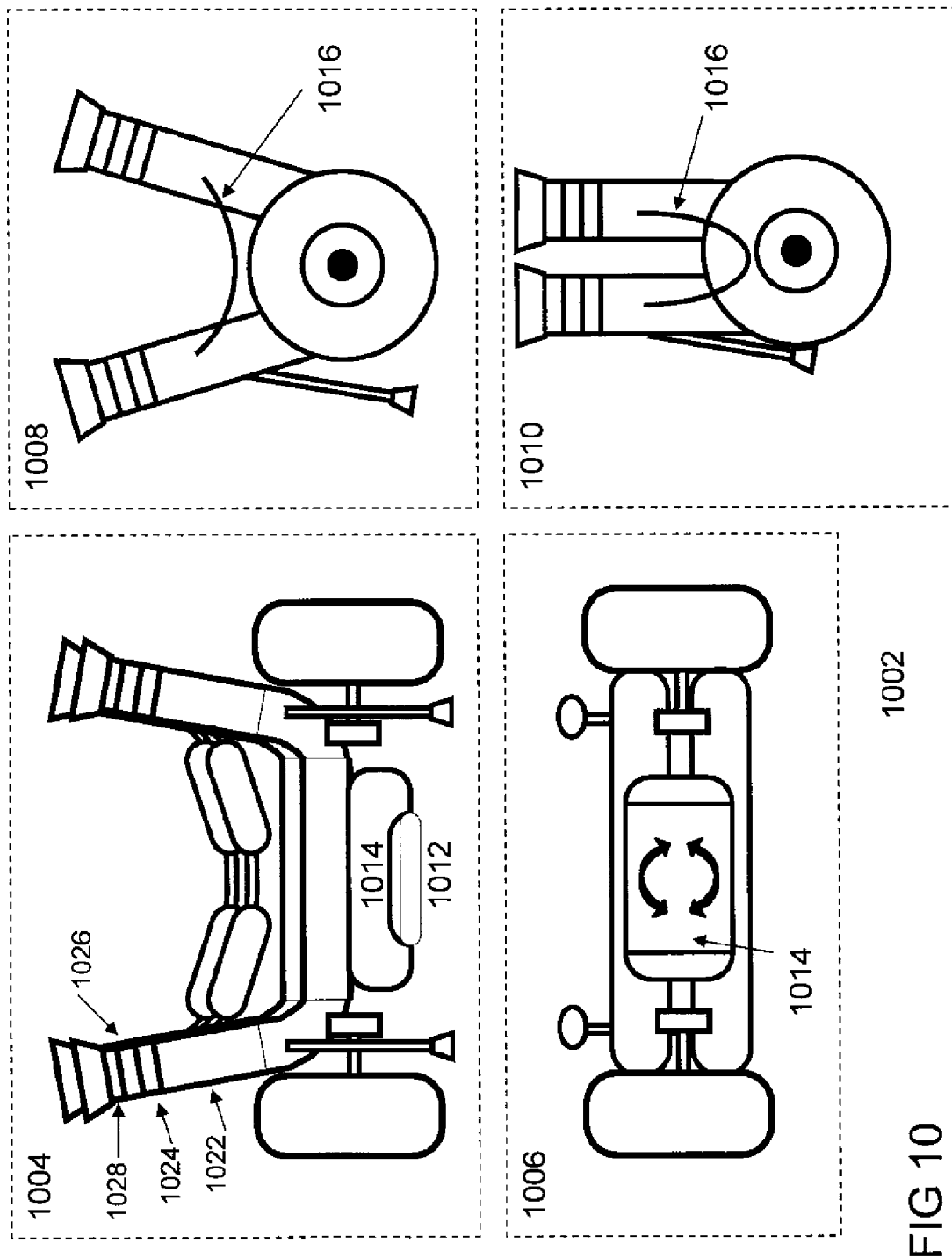
FIG. 10 depicts several views of a loading cart that incorporates teachings of the present disclosure.

FIG. 10 depicts several views of a loading cart 1002 that incorporates teachings of the present disclosure. Head on view 1004 shows many features of cart 1002. Bottom view 1006 focuses on the underside features of cart 1002. Side view 1008 shows cart 1002 with its support members in an opened up position. Side view 1010 shows cart 1002 with its support members in a closed position.

Referring to view 1004, cart 1002 is shown to be similar to the cart depicted in FIG. 9. View 1004 makes it clear that cart 1002 includes two flared "U" supports and that each of those supports has its own sling. As seen, these supports may include multiple telescoping members, including primary member 1022, secondary member 1024, tertiary member 1026, and quaternary member 1028, similar to the view shown in FIG. 5. In practice, these slings may form the topside carriage system of a two-sided carriage system. The second side carriage of the two-sided system may include, for example, the base pad 1014 that is described in more detail below. Cart 1002 also includes two kick stands 1012 and a rotatable base pad 1014. In practice, kick stands 1012 may help maintain cart 1002 in an upright or near upright position. Depending upon design concerns, kick stands 1012 may number from zero on up, may be retractable, may rotate upward to rest along side one of the flared "U" supports, may be fixed in place, etc.

Also shown in view 1004 is base pad 1014. Base pad 1014 can also be seen in view 1006. In practice, base pad 1014 may provide a location on which to rest one end of a canoe, kayak, etc. Base pad 1014 may rotate freely or through some limited range of degrees such as + or −45 degrees. It may be formed of a material unlike, similar to, or the same as pads 716 of FIG. 7. In some versions, pads 716 and/or base pad 1014 may have a coefficient of friction (CoF) that gives the impression that the pad is loosely grabbing the hull of the canoe or kayak that has been rested upon it. For example, a pad material could be selected such that the CoF between dry pad material and a high density polyethylene (HDPE) is between 0.05 and 1.0. Some designers could shoot for a tighter CoF range, such as 0.1 to 0.3.

In some embodiments, base pad 1014 may be removable or deleted all together. With a removable base pad, a user may insert the base pad when using the cart in an upside down position to assist in the loading and/or unloading of a kayak. The same user might choose to remove the base pad when the user wants to use the cart as a step stool. Using the cart in a step stool mode may also require the user to place the cart in its upside down position, but removing the pad may provide a more secure foot placement option for the user.

Referring to views 1008 and 1010, cart 1002 is depicted as having a limiting strap 1016. In practice, strap 1016 may limit the extent to which the flared "U" shaped supports can be "opened up" relative to one another. As indicated above in connection with FIG. 9, the supports may be designed such that the can be rotated away from one another. A designer may want to limit the degree to which this "opening up" can occur.

Strap 1016 is one limiting technique a designer may elect to use. As shown, strap 1016 is fixed to each of the depicted supports at a strap coupling location. The length of strap 1016 and the placement of the coupling location along the upright length of a given support may allow a designer to dictate the maximum degree to which a user can "open up" the supports. In some cases, the length and/or coupling location of the strap may be adjustable, and the strap may be formed from a cord, plastic, rubber, a canvas-like material, a chain, scissoring pieces of metal or plastic, etc. or some combination of these things.

As mentioned above and discussed more fully below, opening up the supports may be useful when a cart is oriented in a wheels down position. This may allow a pair of slings like those depicted in FIG. 10 to move away from one another and provide a more stable hold on one end of a canoe as a user carts the canoe from a car to the water's edge. Similarly, opening up the supports may also help when a user is loading or unloading the canoe from the roof of the car. In this situation, the cart may be oriented "upside down" or wheels up. The flared "U" shaped supports may be opened up and the telescoping members may be extended to effectively raise the height of cart's reversible platform. In this orientation, the opening up and the flared design of the supports may create a relatively sturdy table-like platform on which to set one end of the canoe during the loading and unloading process. In light of the advantageous reversible feature of the cart described herein, a user may want a tethering mechanism that can be utilized on either side of the reversible platform. To that end, FIG. 11 depicts a reversible platform 1102 and one type of tethering system 1104 that incorporates teachings of the present disclosure. As shown, platform 1102 includes attach points 1106 and 1108. These attachment points may be very similar to attachment point 828 of FIG. 8 and may be formed by two slits that extend through platform 1102.

Tethering system 1104 also includes two bungee-like cords 1110 and 1112. Each of these cords has a hook 1114 located at either end. Bungee cords 1110 and 1112 can be connected to one another by engaging together a hook 1114 from each of the cords. Similarly, the cords can be connected to platform 1102 by engage a hook 1114 with an attachment point 1106 or 1108. If the end of a kayak being strapped to platform 1102 is sufficiently small or a cord is sufficiently long, a single cord may be used. Moreover, if more than one or two cords are needed, additional cords can be added as necessary.

One advantage of tethering system 1104 is that it can be utilized with either side of platform 1102. If a user is carting a kayak to the water, tethering system 1104 may be used on the top surface of platform 1102. If a user is loading or unloading a kayak from a car, tethering system 1104 may be used with the other side of reversible platform 1102. For sake of explanation purposes, the top surface of platform 1102 may be the one to which the two flared "U" shaped supports are mounted, and the other side may be the one to which the two wheels are mounted. One skilled in the art will recognize that calling one side the top and the other side the bottom does not affect the operation or purpose of the cart. Moreover, even though platform 802 of FIG. 8 shows that the wheels and the supports are mounted to opposite sides of platform 802, one skilled in the art will recognize that the wheels and supports could also be mounted to the same side of a platform. In fact, in some embodiments, a designer may elect to eschew the use of any platform. For example, two brackets may be used to connect the two "U" shaped supports to one another and to the wheels. An example of such a bracket is depicted in FIG. 14.

Figure 12:
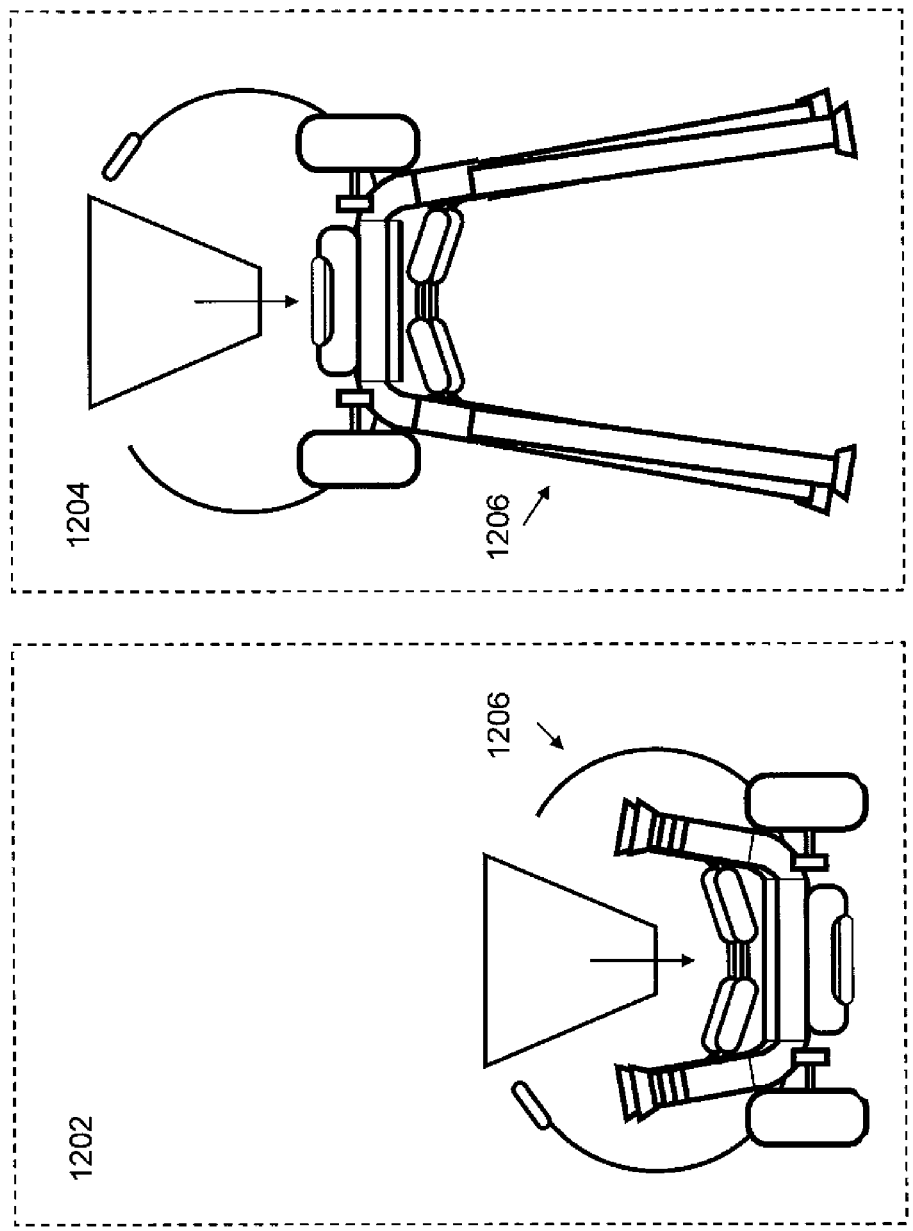
FIG. 12 depicts two use scenarios for a reversible loading cart that incorporates teachings of the present disclosure.
Figure 13:
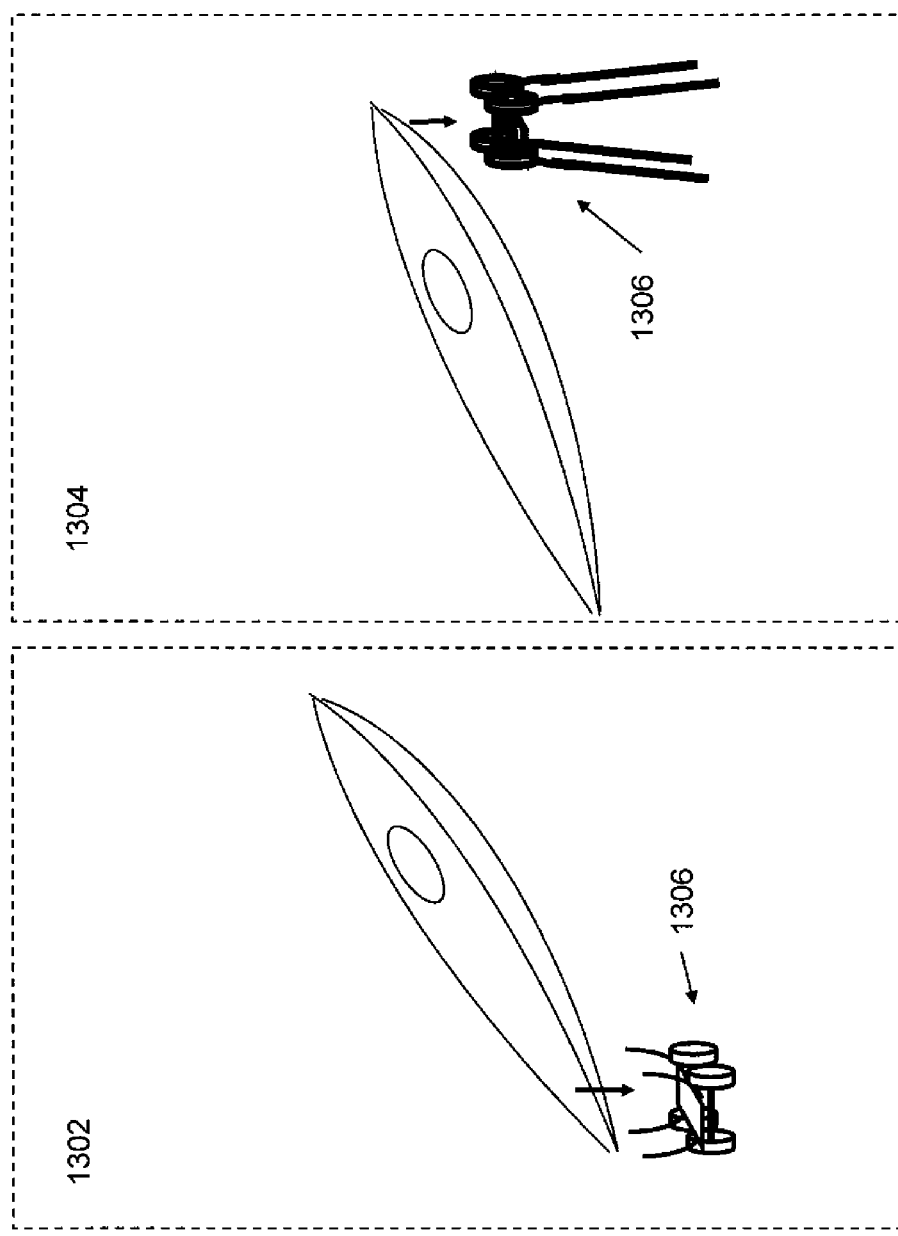
FIG. 13 depicts generalized views of two use scenarios for a reversible loading cart that incorporates teachings of the present disclosure.

FIG. 12 depicts two use scenarios 1202 and 1204 for a reversible loading cart 1206 that incorporate teachings of the present disclosure. Scenario 1202 depicts cart 1206 in a wheels down position. As indicated above, opening up the supports may be useful when a cart is oriented in this position. In scenario 1202, a pair of slings (like those depicted in FIG. 10) have moved away from one another and are providing a stable hold on one end of a canoe as a user moves the canoe from a car to the water's edge. As shown, the canoe is lowered into the slings and strapped down with a tethering system, which may be similar to the one depicted in FIG. 11. Similarly, in scenario 1204, a user has inverted cart 1206 and extended the telescoping supports to create four legs and to raise the body of cart 1206 to a height that facilitates loading and unloading the canoe from a car's roof rack. In this orientation, the opening up and the flared design of the supports may create a relatively sturdy table-like platform on which to set one end of the canoe during the loading and unloading process. Because the legs extend out and away from the body of cart 1206, the table-like structure depicted in scenario 1204 is less likely to tip over and fall. Again, a tethering system, like the one depicted in FIG. 11, may be used to strap one end of the canoe to the body of cart 1206. In addition, the canoe may be strapped onto a base pad with a saddle like cut out (like the one shown in FIG. 10)—allowing a user to rotate the canoe relative to cart 1206. A generalized view of these two use scenarios can be seen in FIG. 13, which depicts two use scenarios 1302 an 1304 for a four wheeled reversible loading cart 1306 that incorporate teachings of the present disclosure. In FIG. 13 the object being carted in scenario 1302 and loaded in scenario 1304 is a kayak.

As mentioned above, FIG. 14 depicts several views of a bracket 1402 that may be used in the creation of a loading cart that incorporates teachings of the present disclosure. FIG. 14 includes front view 1404, top view 1406, bottom view 1408, and side view 1410.

Figure 14:
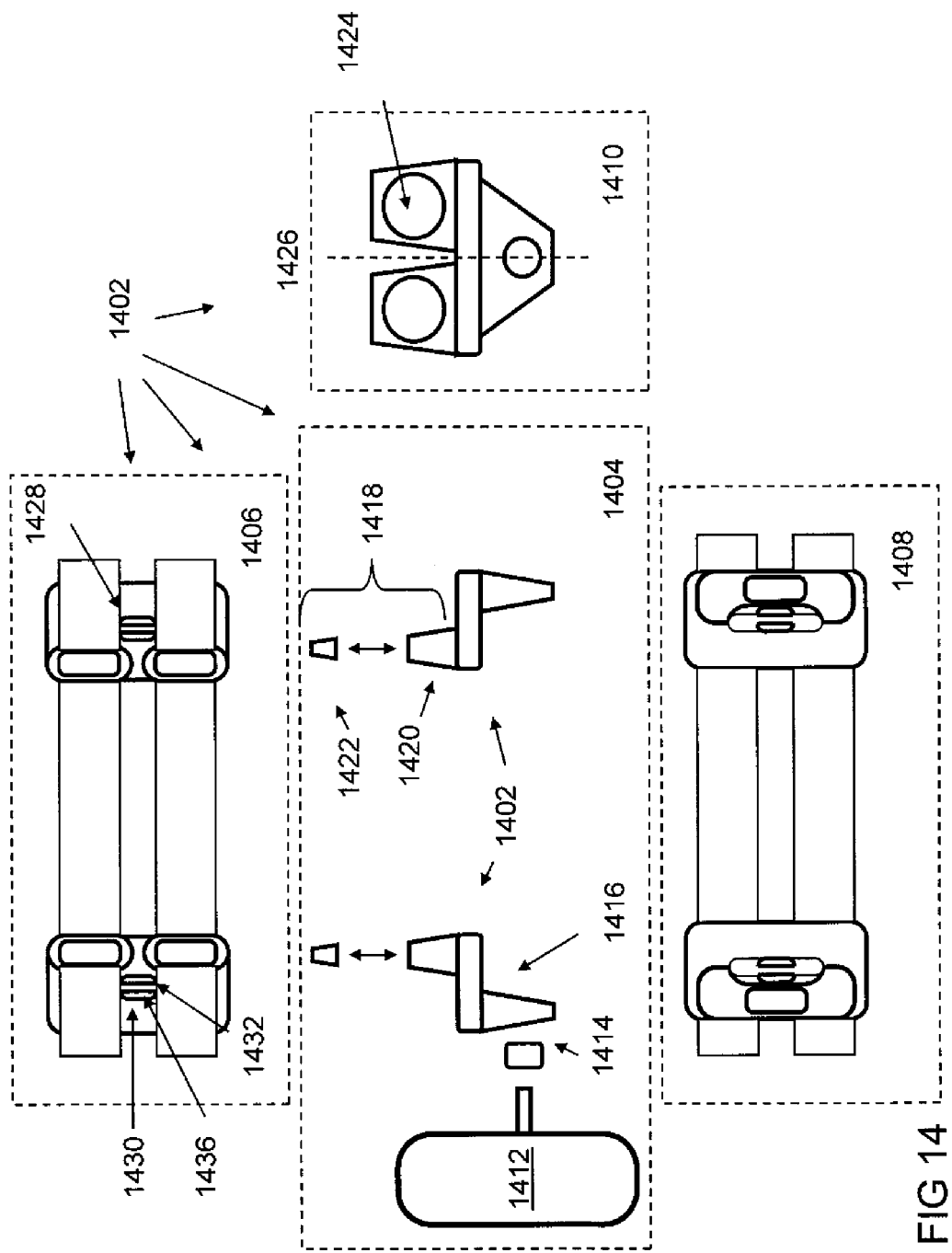
FIG. 14 depicts several views of a bracket that may be used in the creation of a loading cart that incorporates teachings of the present disclosure.

FIG. 14 depicts a pair of brackets 1402 designed for use in a two-wheeled system that has two composite telescoping support mechanisms. In other words, a designer could use two brackets 1402 with two wheels and two supports like support 702. In connection with view 1404, one wheel 1412 and an associated bearing 1414 are shown in an exploded view. In practice, the axle of wheel 1412 would be affixed inside bearing 1414, which would be located inside a wheel mount portion 1416 of a bracket 1402.

A support mounting system 1418 is also shown in connection with view 1404. As depicted, mounting system 1418 includes a base portion 1420 that is formed as part of bracket 1402 and a removable top portion 1422 that is shown in a removed position. In a manufacturing or assembly process, top portion 1422 may be removed from base portion 1420 to allow a support like support 702 to be mounted into base portion 1420. Once the support is pressed into base portion 1420, top portion 1422 may be affixed to base portion 1420 with screws, clips, etc. Once affixed, base portion 1420 and top portion 1422 may form an open cross section within which a mounted support may rotate. In some embodiments, support 702 may have an indented or notched cross section along its horizontal length that ensures that mounting system 1418 and the mounted support interact at the proper location along the horizontal length of the support. This altered cross section may also be used to manage the number of degrees through which the support can rotate within mounting system 1418.

View 1410 shows a generally circular cross sectional design for the opening formed by mounting system 1418 (labeled 1424). As depicted, open cross section 1424 is generally circular. Other cross sections may be used depending upon design concerns. Moreover, rotational limiters may be implemented within mounting system 1418. For example, a designer may not want a given support to be capable of rotating past a center line (like center line 1426 depicted in view 1410). In such a circumstance, the designer may modify or alter mounting system 1418 and/or the support mounted therein to limit the rotation of a mounted support.

Views 1406 and 1408 show an additional element of brackets 1402. This additional element, a tether attach point, is identified by numeral 1428. Attach point 1428 is formed by two slits 1430 and 1432 that extend through the body of bracket 1402. In practice, a user of bracket 1402 may have a tethering mechanism that includes one or more bungee-like cords. An example of such a tethering system is shown in FIG. 11. In such a system, the user may elect to extend the hook-like end of a bungee cord through one of the slits like slit 1430, turn the hook through a quarter turn, and then extend the tip of the hook back through the other slit. In effect, the user would simply be hooking center strip 1436 with the hook-like end of a bungee cord. As such, attach point 1428 acts as a convenient location to attach a bungee cord to bracket 1402.

Unlike the embodiment shown in FIG. 8, the FIG. 14 embodiment does not provide a platform portion that is separate from the flared "U" supports and runs the horizontal length of the loading cart. As such, the platform surface or carriage system upon which a kayak may be rested during the loading and unloading process could simply be the underside of the horizontal tubes that interconnect the telescoping members and form the bottom or horizontal portion of the flared "U" supports. Similarly, the sling like structure described in FIG. 8 may not be necessary for some designers. As such, the surface or top-side carriage upon which a kayak may be rested during the carting process could simply be the topside of the horizontal tubes that form the bottom of the two flared "U" supports.

Although only a few exemplary embodiments have been described in detail above, those skilled in the art will readily appreciate that many modifications are possible in the exemplary embodiments without materially departing from the novel teachings and advantages of the embodiments of the present disclosure. By way of example, though several support members were described as having a flared "U" shape, other shapes and configurations could be used. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures. Moreover, the drafters of this disclosure explicitly use "means for" language in the claims when making use of a means-plus-function clause.

The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features that may be, for the sake of clarity, described herein in the context of separate embodiments, may also be provided in combination in a single embodiment. Conversely, various features that are, for brevity, described in the context of a single embodiment, may also be provided separately or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A loading and carting system, comprising:
a composite support structure having two telescoping members and an interconnection portion that at least partially links the two telescoping members, the composite support structure having a generally flared "U" shape;
a second composite support structure also having the generally flared "U" shape;
a mounting system coupled to the composite support structure and the second composite support structure, the mounting system comprising a platform having at least two tire attachment locations; and
a two-sided carriage system having a first side carriage system comprising a sling structure configured to support a bulky object during a carting process when the two-sided carriage system is oriented in a first position in which the first side carriage system is oriented upwards such that the two telescoping members extend upwards from the interconnection portion and a second side carriage system opposing the first side carriage system comprising a base pad rotatably coupled to a platform and configured to support the bulky object during a loading or unloading process when the two-sided carriage system is oriented in a second position in which the second side carriage system is oriented upwards such that the two telescoping members extend downwards from the interconnection portion.

2. The system of claim 1, wherein the mounting system comprises at least two independent brackets.

3. The system of claim 1, wherein the platform forms at least a portion of the interconnection portion of the composite support structure.

4. The system of claim 1, wherein the two telescoping members each comprise a primary member, a secondary member, and a tertiary member, further wherein a footing device is coupled to an end of the tertiary member.

5. The system of claim 1, wherein the two telescoping members each comprise a primary member, a secondary member, a tertiary member, and a quarternary member, further wherein a footing device is coupled to an end of the quarternary member.

6. The system of claim 1, further comprising tethering means for releasably securing the bulky object during the carting process.

7. A method comprising:
  carting a bulky object from a first location to a second location using a loading and carting system including:
    a composite support structure having two telescoping members and an interconnection portion that at least partially links the two telescoping members, the composite support structure having a generally flared "U" shape;
    a second composite support structure also having the generally flared "U" shape;
    a mounting system coupled to the composite support structure and the second composite support structure, the mounting system having at least one tire attachment location; and
    a two-sided carriage system having a first side carriage system configured to support the bulky object during the carting when the two-sided carriage system is oriented in a first position in which the first side carriage system is oriented upwards such that the two telescoping members extend upwards from the interconnection portion; and
  loading the bulky object onto a vehicle roof using the loading and carting system, wherein the two-sided carriage system includes a second side carriage system opposing the first side carriage system and configured to support the bulky object during the loading when the two-sided carriage system is oriented in a second position in which the second side carriage system is oriented upwards such that the two telescoping members extend downwards from the interconnection portion.

8. The method of claim 7, further comprising unloading the bulky object from the vehicle roof using the loading and carting system.

\* \* \* \* \*